Sept. 1, 1936. G. B. HARRISON 2,052,624
METHOD OF AND MEANS FOR CONTROLLING THE PRINTING EXPOSURE
IN THE PRODUCTION OF POSITIVE CINEMATOGRAPH FILMS
Filed Aug. 21, 1933
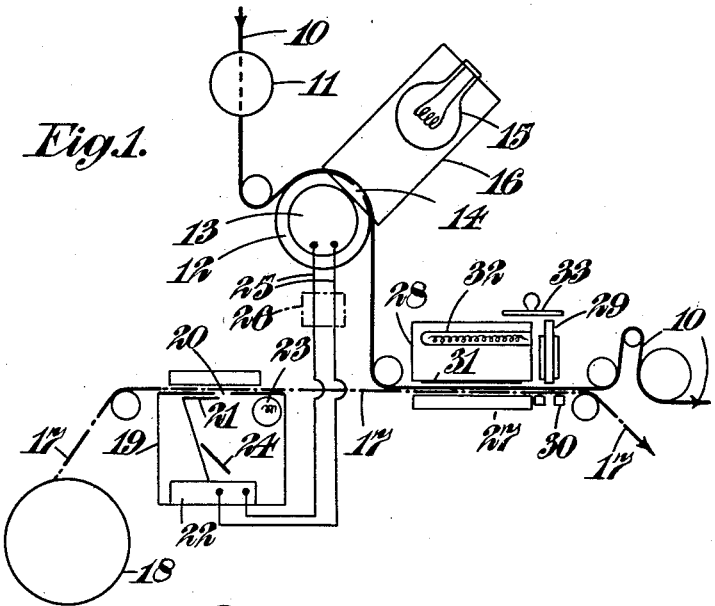
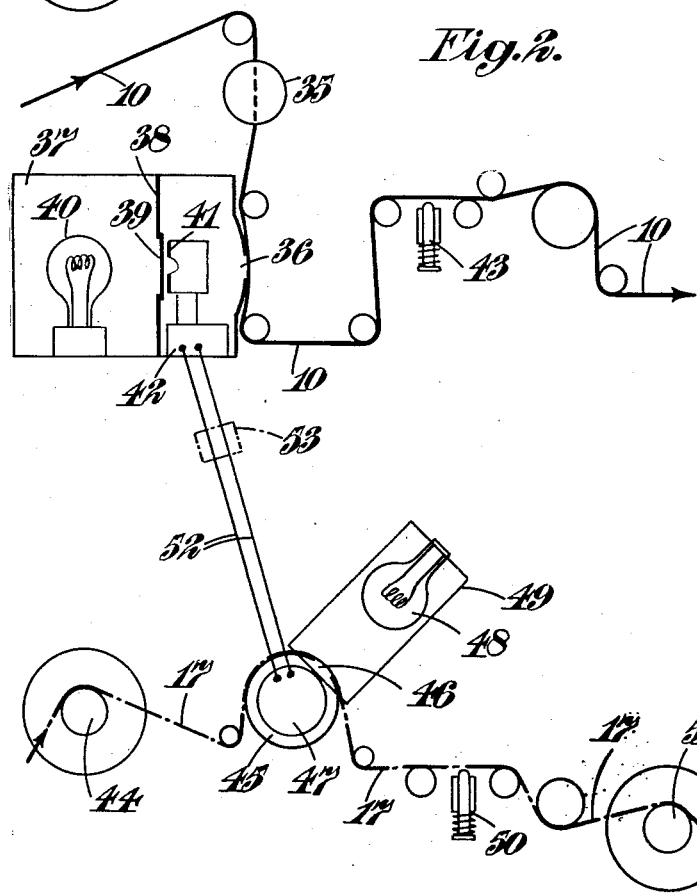

Patented Sept. 1, 1936

2,052,624

UNITED STATES PATENT OFFICE 2,052,624

METHOD OF, AND MEANS FOR, CONTROLLING THE PRINTING EXPOSURE IN THE PRODUCTION OF POSITIVE CINEMATOGRAPH FILMS

Geoffrey Bond Harrison, Ilford, England, assignor to Ilford Limited, Ilford, England, a British company Application August 21, 1933, Serial No. 686,134
In Great Britain August 29, 1932

4 Claims. (Cl. 95—5)

This invention comprises improvements in or relating to methods of, and means for, controlling the printing exposure in the printing of a cinematograph film either by the printing of a copy from a master film or by reversing the image on the same film.

The invention is principally concerned with the production of positive films by the known reversal method in which the need for a second (i. e. positive) film is avoided by developing the original film and then reversing the image on it. In the reversal method the film, after exposure in the camera, is first developed, the negative silver image is then bleached out and the film is thereafter exposed to light and redeveloped to bring out the latent positive image, and finally the film may be fixed.

In the reversal method, for the purpose of controlling the re-exposure of the film in accordance with the varying density of the first developed image, it has already been proposed to pass the film, after bleaching and immediately before it reaches the re-exposure station, over a light-responsive element, such as a thermopile, (whose response will vary according to the varying density of the bleached film) arranged to control a circuit operating a shutter to vary the amount of light which reaches the film at the exposure station. A similar method has been proposed in connection with the contact printing (through a negative film) of a positive image on a second film, the light-responsive element being employed to explore the negative film and simultaneously control the contact-printing exposure.

This invention provides, in the printing of a copy from a master cinematograph film, a method of automatically controlling the printing exposure which consists in producing a photographic record of the variations of density throughout the length of the master film and subsequently employing that record automatically to control, in accordance with the recorded variations, the printing exposure.

In the process of reversing (i. e. from negative to positive or vice versa) the image on a cinematograph film, the present invention provides a method for controlling the exposure of the latent reversed image, which consists in producing a record of the variations of density throughout the length of the film before the exposure aforesaid, and subsequently employing that record automatically to control the exposure in accordance with the recorded variations.

In the application of the present process to the reversal method of printing, it is a feature of this invention that the negative film is explored between the end of the first development and the operation of bleaching. It will be understood that at this stage the film has upon it both the developed negative image and also the unaffected silver salt from which is to be formed the positive image. It should be explained that in the reversal method if the whole of the residual silver salt, after removal of the negative image, is exposed and developed, the positive image may be faulty either from errors in the first exposure or because the original coating weight of the emulsion was not quite uniform. It is believed that there are certain technical advantages in exploring the film and determining its density characteristics at that stage in the process which comes after the first development and before bleaching rather than at a later stage when the developed image has been bleached out.

Normally in carrying out the reversal method of printing, the film after the first development, and before re-exposure, is treated in successive baths, such as a stop bath, washing bath, followed by a bleaching bath and a clearing bath, and finally a washing bath. In the application of the present invention, there will be ample time during the passage of the film through the successive baths aforesaid, for the production of the permanent density record which is to be employed in controlling the final exposure of the film to produce the positive image.

Conveniently in carrying out the invention the permanent density record is produced on a strip of photographic film by exposing that strip to a beam of light, the effective intensity or exposure area of which is varied in accordance with the response of a light-sensitive cell to the varying density of image on the negative film explored by the cell. For example the negative film, after the first development and before bleaching, may be moved past a recording station between a source of light (infra-red radiation may if desired be used) and a light-sensitive cell included in a circuit comprising an instrument of the galvanometer type. In this way the movable element of the galvanometer will move under the control of the cell in accordance with the varying density of the film. For the purpose of producing the permanent density record the galvanometer may be arranged to operate a mirror on to which a beam of light is projected and from which it is reflected on to a record strip of photographic film moved in synchronism with the movement of the negative film past the recording station. A record strip is thus produced in which the density variations in the negative film are represented by variations in the width of the silver deposit on the record film. Alternatively the galvanometer may operate a shutter which in turn controls the exposure of the record strip.

It will be appreciated that the permanent record may be made on a comparatively small strip say for example, one foot for every hundred feet of the negative film. The record strip may be developed and fixed during the continued movement of the negative film through the bleaching and washing baths, so that by the time the negative film is ready for the second exposure the record strip is ready for passage over a light-sensitive cell or other exploring device to control (e. g. by a shutter operated by current influenced by the cell) the second exposure of the negative film.

Two examples according to the invention will now be described with reference to the accompanying diagrammatic illustrations in which:—

Figures 1 and 2 are of the first example and show respectively the recording and printing units.

Referring in the first place to Figures 1 and 2, the apparatus shown therein is for use in the known reversal process of printing a positive cinematograph film.

The cinematograph film 10 (shown in full lines) is passed through a moisture-removing device 11 and then over a cylindrical casing 12 containing a photo-electric cell 13. In the wall of the cylindrical casing is an aperture 14 in front of which is mounted a lamp 15 enclosed in a cylindrical housing 16. The record film 17 (shown in chain lines) is contained in a storage container 18 and is passed over a box 19 in the top surface of which is an aperture 20 in the form of a slit. Immediately below this aperture is a shutter 21 mounted on the spindle of, and operated by, a galvanometer 22. In the box 19 is also enclosed means for illuminating the slit aperture 20 which may be conveniently a lamp 23 and a reflecting mirror 24. The galvanometer 22 is connected through by leads 25 to the photo-electric cell 13, if desired with the interposition of an amplifier 26.

In operation, the photo-electric cell 13 receives light from the lamp 15 passing through the film 10 and the aperture 14 and generates energy in accordance with the amount of light it receives. This energy is transferred to the galvanometer 22, which operates the shutter 21 over the slit 20 in accordance with the energy received and thus that portion of the slit uncovered by the shutter is exposed to light from the lamp 23 and the record strip 17 is consequently exposed in accordance with the density of the negative film 10, as recorded by the photo-electric cell.

The negative film 10 after passage over the aperture 14, and the record film 17 after passage over the aperture 20, are together guided over a table 27 which forms part of a marking device. Above the table 27 a vertically movable box 28 is positioned, and also a punch 29 which co-operates with a die 30 which forms an extension of the table 27. The floor of the box 28 is fitted with a stencil plate 31, bearing a suitable identifying inscription, and within the box an illuminating lamp 32 is housed. The box 32 and punch 29 are arranged for simultaneous operation by means of a hand-lever 33. The negative film 10 and record film 17 having been threaded through the marking device, and before operations are commenced, the lever 33 is depressed and thereby the punch 29 is forced through the two films and simultaneously the box 28 is forced downwardly so that its lower surface lies on the uppermost film. The box 28 is so arranged that on its downward movement it operates contacts to illuminate the lamp 32 and in this way the stencil 31 is light-printed on to the films. It is to be understood that the punch holes and stencil marks on the film are for registration and identification purposes, and they are formed on portions of the films which do not bear the photographic images. Beyond the marking device the negative film 10 is led to the bleaching baths, and the record film 17 is led away to be developed and fixed.

After development of the record film 17 and bleaching of the negative film 10, both films are passed to the printing apparatus shown in Figure 2. The bleached film 10 is first passed through a moisture trap 35 and then guided in front of a printing aperture 36 formed in the curved front of a box 37 which is divided into two portions by a screen 38 having a square aperture 39 covered by an opal glass plate in front of the printing aperture. On the side of the screen 38 remote from the printing aperture 36, the box contains a printing lamp 40 and on the other side of the screen is a shutter 41 which is mounted on the spindle of a galvanometer 42 enclosed in the same part of the box. The shutter 41 may conveniently be in the form of a cylinder mounted centrally upon the spindle of the galvanometer 42, the half towards the printing aperture being a skeleton framework, the other half being in the form of a curved plate having a varying aperture which moves over the surface of the opal screen according to the movements of the galvanometer. The film 10 after passing the printing aperture is led over a registering pin 43 and from thence to the final development, fixing and washing baths.

The developed record film 17 is mounted on a storage reel 44 and passed over a cylindrical housing 45 having an aperture 46 in its wall, and enclosing a photo-electric cell 47. Over the aperture 46 a lamp 48 is mounted in a cylindrical casing 49. The film after passing the aperture 46 is led over a registering pin 50 and is then re-wound on a re-winding coil 51.

The photo-electric cell 47 is connected by leads 52 to the galvanometer 42, and if necessary an amplifier 53 may be included in this circuit.

In operating the printing apparatus shown in Figure 2, the two films 10 and 17 are first threaded through their respective portions of the apparatus until the perforations which have been made by the punch 29 (i. e. in the recording apparatus) are in register with the registering pins 43 and 50 respectively. The photo-electric cell 47 then receives light from the lamp 48 through the record film 17 and the aperture 46 in the cell housing and generates energy in accordance with the light falling upon it. The energy is then transferred to the galvanometer 42, and the shutter 41 is thus moved in accordance with the effect on the galvanometer thereby proportionately increasing or diminishing the amount of light falling upon the printing aperture 36. After passing through the printing apparatus the negative film 10 is led to the second or final developing bath and subsequently to the fixing and washing baths to produce the final positive copy. The record film 17 is led to the re-winding coil 51.

In using a machine of the kind illustrated the negative film may, if desired, be developed on a frame and passed from the frame through the recording apparatus illustrated in Figure 1, and then re-wound on to a frame on which it is placed in the bleaching bath. The frame may then be removed from the bleaching bath and the film passed through the printing apparatus shown in Figure 2, after which it may be re-wound on a further frame on which it may be subjected to the final development, fixing and washing processes. Alternately, the recording and printing units may be inserted in sequential positions in a continuous processing machine.

The devices illustrated herein have been described with reference to the reversal process of printing, but it will be understood that the recording apparatus illustrated in Figure 1 may equally well be employed for preparing a density record of a finished negative (or positive) for which a copy is to be made. Again the printing apparatus shown in Figure 2 may be adapted (for example by the provision of contact printing gates at the aperture 36) for printing a copy from the master film, the density record being utilized as before for controlling the printing exposure.

This invention includes the method and means for controlling the printing exposure and also the density of record itself. The record, apart from its use as a control device is of utility in furnishing to the camera man a helpful indication of the conditions under which the original film was exposed.

I claim:—

1. In a process of reversing the image on a cinematograph film which comprises bleaching the original image after development, re-exposing the bleached film and re-developing the film, the method of controlling the extent of re-exposure in accordance with the density of the original image which comprises the steps of making a photographic transparency record of the density of the original image before bleaching and throughout the length of the film and controlling the re-exposure light during the re-exposure of the film by passing light through the portion of the record corresponding to the portion of the film being exposed at any instant on to light-responsive means arranged automatically to vary the amount of re-exposure light reaching the film in accordance with the amount of light transmitted by the record on to the said light-responsive means.

2. In a process of reversing the image on a cinematograph film which comprises bleaching the original image after development, re-exposing the bleached film and re-developing the film, the method of controlling the extent of re-exposure which comprises the steps of making a photographic transparency record of the density of the original image throughout its length and before bleaching by exposing a photographic strip to a beam of light the effective amount of which is varied in accordance with the response of light-responsive means to variations in a light beam corresponding to the varying density of the original image and produced by passing the original image between a light source and the responsive means and controlling the light used for re-exposure by passing light through the portion of the record corresponding to the portion of film being re-exposed at any instant on to light-responsive means arranged automatically to vary the amount of re-exposure light reaching the film in accordance with the amount of light transmitted by the record on to the last-mentioned light-responsive means.

3. Apparatus for use in reversing the image on a cinematograph film which comprises in combination means for producing a photographic record of the density of the original image, a bleaching bath, a re-exposure station and co-operating light source, means for varying the amount of light reaching the film at the re-exposure station arranged for automatic control by the record strip, a developing bath and means for moving the cinematograph film through the bleaching bath past the re-exposure station and through the developing bath.

4. In a process of reversing the image on a cinematograph film which comprises bleaching the original image after development, re-exposing the bleached film and re-developing the film, the method of controlling the extent of re-exposure which comprises the steps of making a photographic transparency record of the density of the original image throughout its length and before bleaching by exposing a photographic strip to a beam of light the effective amount of which is varied in accordance with the response of light-responsive means to variations in an infra-red radiation light beam corresponding to the varying density of the original image and produced by passing the original image between a source of infra-red radiation and the radiation-responsive means aforesaid and controlling the light used for re-exposure by passing light through the portion of the record corresponding to the portion of film being re-exposed at any instant on to light-responsive means arranged automatically to vary the amount of re-exposure light reaching the film in accordance with the amount of light transmitted by the record on to the last-mentioned light-responsive means aforesaid.

GEOFFREY BOND HARRISON.